Oct. 23, 1956  F. W. BIRELEY  2,767,645
APPARATUS FOR EXTRACTING CITRUS JUICES
Filed Sept. 18, 1951  3 Sheets-Sheet 1
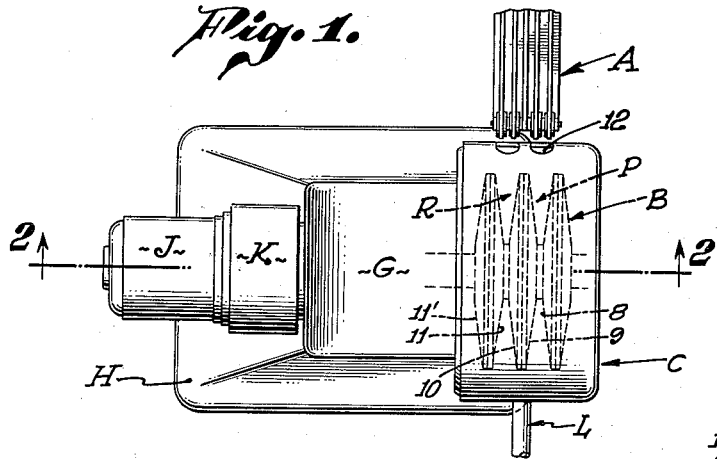
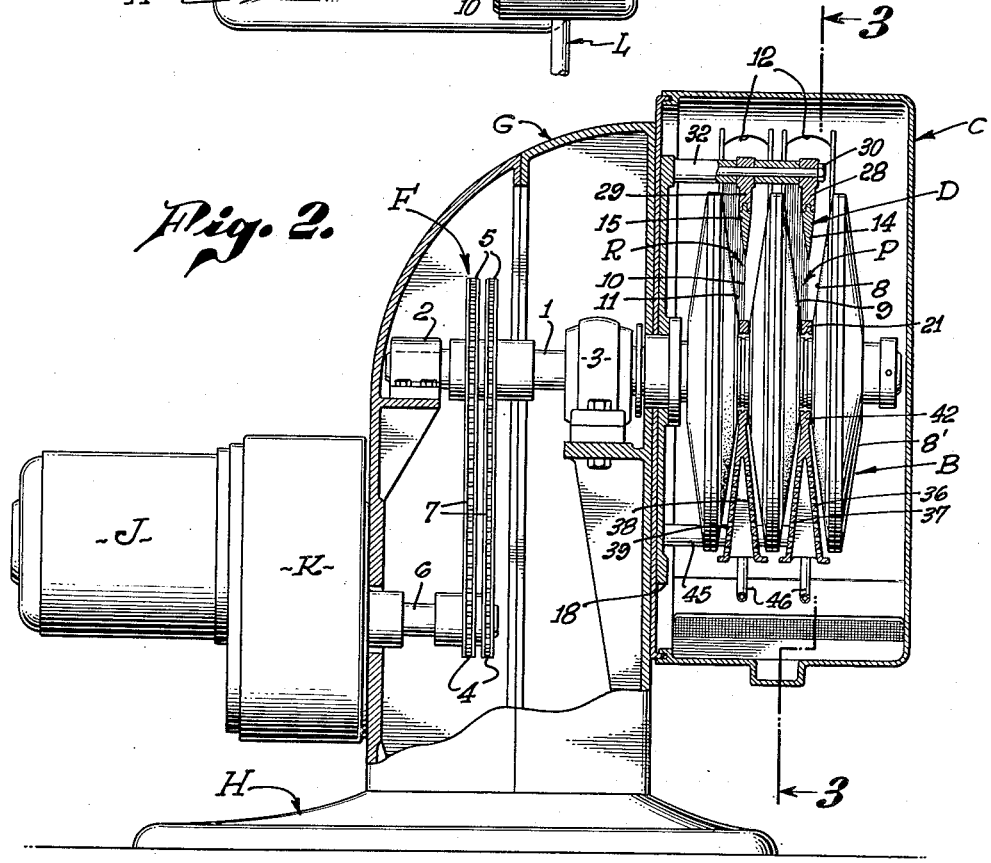
FRANK W. BIRELEY,
INVENTOR.
BY Paul A. Weilein
ATTORNEY.

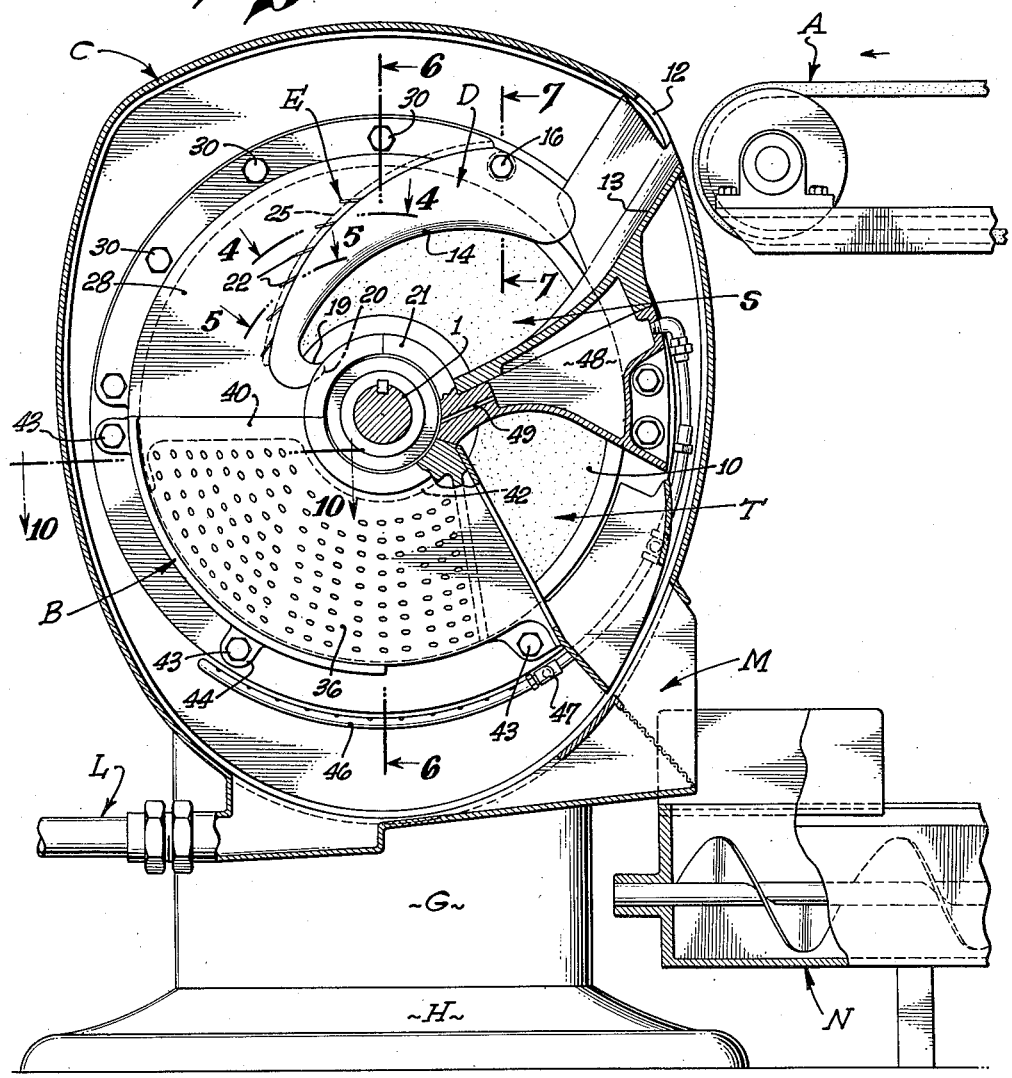

Oct. 23, 1956 F. W. BIRELEY 2,767,645
APPARATUS FOR EXTRACTING CITRUS JUICES
Filed Sept. 18, 1951 3 Sheets-Sheet 3
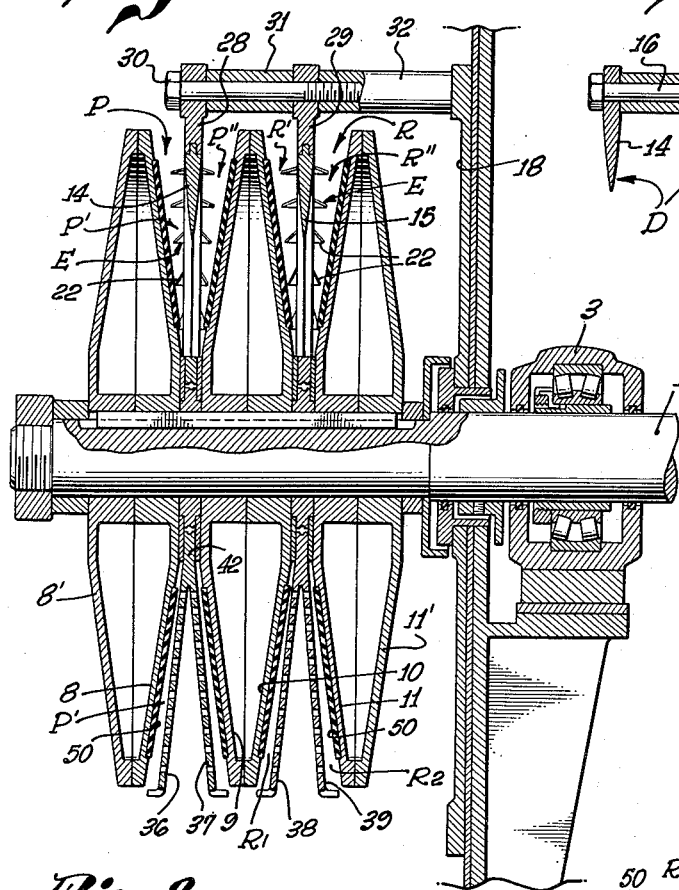
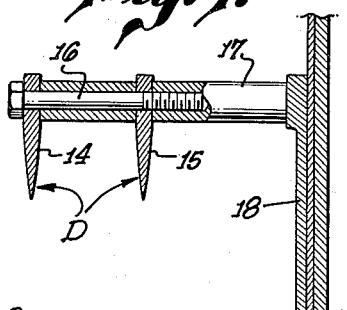
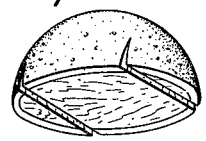
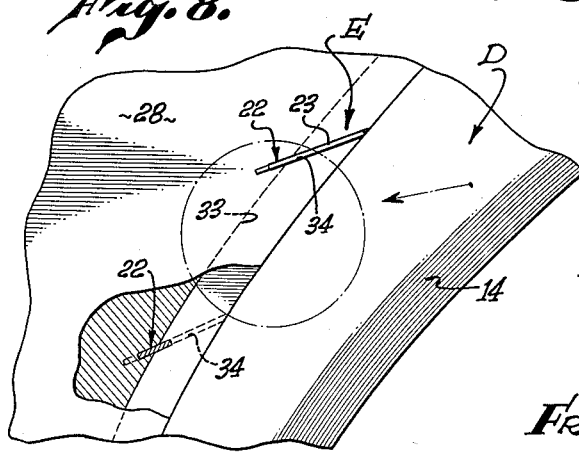
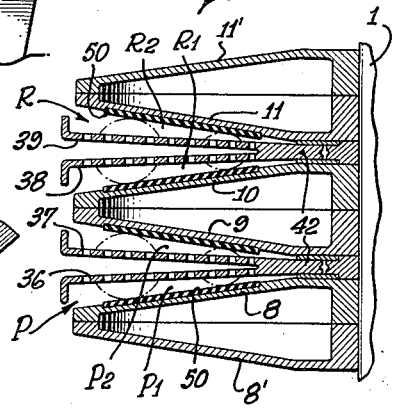
INVENTOR.
FRANK W. BIRELEY,
BY
Paul A. Weilein
ATTORNEY.

United States Patent Office 2,767,645
Patented Oct. 23, 1956

2,767,645

APPARATUS FOR EXTRACTING CITRUS JUICES

Frank W. Bireley, North Hollywood, Calif.

Application September 18, 1951, Serial No. 247,105

15 Claims. (Cl. 100—98)

This invention relates to the extraction of citrus fruit juice and more particularly to apparatus for this purpose wherein cut sections of the fruit are advanced between surfaces which subject the fruit to a progressively increasing pressure to express the juice.

In order to obtain the desired yield of juice with apparatus of this character, the cut sections of the fruit are subjected to a pressure which tends to express an undesirable amount of rind oil with consequent impairment of the quality of the juice. Moreover, such high pressures impose undesirable stresses on the apparatus and interfere with an efficient juice extracting operation thereof.

It is therefore an object of this invention to provide an improved apparatus of the character described which will prevent the release of an undesirable amount of rind oil and other components of the fruit and at the same time obtain a maximum yield of juice of the desired quality without subjecting the fruit to the high pressures heretofore employed.

It is another object of this invention to provide a novel means whereby fruit juice extracting apparatus such as described may be operated to obtain the desired yield of fruit juice without release of undesirable amounts of rind oils and other components of the fruit.

It is a further object of this invention to provide a novel means for operation in connection with juice extracting apparatus, wherein the edges of the rind of citrus fruit halves are cut by this means in a manner making it possible to apply the desired pressure to the fruit halves for a more efficient juice expressing operation without releasing undesirable amounts of rind oil, pulp, and other components of the fruit.

It is a further object of this invention to provide juice extracting apparatus wherein the foregoing and other advantages are obtained with citrus fruit over a wide range of sizes continuously fed into the apparatus.

It is an additional object of this invention to provide juice extracting apparatus wherein whole fruit over a wide range of sizes continuously fed to the apparatus will be bisected, the halves sliced across the cut faces and the edges of the rind and then subjected to a progressively increasing pressure which will substantially flatten the fruit in a manner providing the objects and advantages herein noted.

This invention possesses many other advantages and has other objects which may be made more easily apparent from a consideration of one embodiment of the invention. For this purpose there is shown one form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 1 is a top plan view of juice extracting apparatus embodying the present invention;

Fig. 2 is a sectional view, partly in elevation and on an enlarged scale, taken substantially as indicated by the line 2—2 of Fig. 1;

Fig. 3 is a sectional view, partly in elevation on a further enlarged scale, taken substantially as indicated by the line 3—3 of Fig. 2;

Fig. 4 is an enlarged detail section taken substantially as indicated by the line 4—4 of Fig. 3;

Fig. 5 is a sectional view of the detail shown in Fig. 4, taken substantially as indicated by the line 5—5 of Fig. 3;

Fig. 6 is a sectional view taken substantially as indicated by the line 6—6 of Fig. 3;

Fig. 7 is a fragmentary sectional view partly in elevation, taken substantially as indicated by the line 7—7 of Fig. 3;

Fig. 8 is an enlarged fragmentary elevational and part sectional view showing how the slitting knives cut across the cut faces and rind edges of the fruit halves;

Fig. 9 is a perspective view of one half of a piece of citrus fruit as cut across the cut face and edge of the rind thereof in accordance with this invention; and Fig. 10 is a sectional view taken substantially as indicated on the line 10—10 of Fig. 3.

In carrying out this invention provision is made for treating the rind of sections of the fruit, preliminary to expressing the juice, in a manner whereby the sections may be pressed substantially flat for an optimum yield of juice without releasing objectionable amounts of rind oil or without employing the high pressure forces heretofore required.

For this purpose a novel knife means is provided in the path in which the fruit sections are advanced to the means for applying pressure thereto for expressing the juice. This knife means is arranged to make slicing cuts across the cut faces and rind edges of the fruit sections as the latter are advanced, so that the edge of the rind is slit or cut at substantially opposite points. With the rind cut in this manner the fruit sections are subject to being more easily pressed substantially flat without subjecting the rind to such pressure or treatment as would express an objectionable amount of rind oil.

One form of juice expressing apparatus embodying the present invention, as here shown, generally comprises a feed means A for continuously feeding whole citrus fruit to juice expressing means B enclosed by the housing C. Within this housing is a knife means D for bisecting the fruit, also the novel knife means E of this invention, positioned to cut across the cut faces of the fruit halves so that the rind edges will be slit or cut at substantially opposite points preliminary to the juice extracting operation.

The juice extraction means B is operated by means of a drive mechanism F in a housing G mounted on a base H which also supports the housing C. An electric motor J, through a gear reduction unit K, operates the drive mechanism F.

The extracted juice drops into the lower end of the housing C where it is taken off for storage or other treatment through a conduit L. The spent fruit is discharged from the expressing means B through a chute M onto a take-off conveyor N.

It should be noted that the apparatus here shown and described is substantially the same as that shown in my copending application, Serial No. 180,658, with the exception of the knife means E embodied therein for cutting across the cut faces and the rind edges of the fruit halves. However, it is to be understood that the knife means as here provided may be used to advantage in other juice extracting apparatus wherein it is desired to make slicing cuts in the rind edges of the fruit sections preliminary to passing the cut sections between surfaces for exerting pressure to extract the juice.

Referring more specifically to the drawings, it will be seen that the juice expressing means is operated by means of a horizontal shaft 1 journalled in bearings 2 and 3 and driven by the means F which latter, as shown in Fig. 2, includes sprockets 4 and 5 on the reduction unit shaft 6 and main shaft 1 respectively, and drive chain 7 mounted on these sprockets.

The juice expressing means B as here shown includes circular, concavo-convex disk members 8, 9, 10 and 11 keyed on the shaft 1 with their convex sides outermost.

The disk 8 is provided with a companion disk 8' of similar construction, mounted on the shaft 1, with the peripheral portions of the two disks abutting one another. The disks 9 and 10 are arranged between disks 8 and 11 and joined to one another as are the disks 8 and 8', whereas disk 11 has a companion disk 11' associated therewith in the same manner.

Pathways P and R along which the fruit is advanced, are defined between the disks 8 and 9 and the disks 10 and 11 respectively. These pathways have intake ends S for whole fruit and outlet ends T for spent fruit, the fruit being moved from the intake ends to the outlet ends upon rotation of the disks 8, 9, 10 and 11.

Whole citrus fruit is fed by the feed means A so that it will gravitate therefrom through openings 12 in the housing C onto feed chutes 13. These chutes extend between the disks 8 and 9 and 10 and 11 so that the fruit will drop therefrom into the intake ends S of the pathways P and R.

As the opposed surfaces of the disks 8, 9, 10 and 11, between which the pathways P and R are formed, converge radially toward the axes of the disks, that is, converge in a direction transverse to the direction of advance of the fruit, it is apparent that whole fruit dropping from the chutes 13 into the intake ends S of the pathways P and R will become wedged between the disks 8, 9, 10 and 11 at different levels or locations according to the sizes of the fruit. Thus, the whole fruit will be gripped between the disks and advanced in different paths according to size in the pathways P and R toward the bisecting knife means D as the disks are rotated, in this instance, counterclockwise, looking toward Fig. 3.

The knife means D, as here shown, comprises a pair of curved knives 14 and 15 mounted in the pathways P and R for bisecting the whole fruit. These knives are secured at their upper ends by means of suitable fastenings 16 to a member 17 projecting from a wall 18 of the housing C. The lower or inner ends of the knives 14 and 15 are provided with hook-like portions 19 which engage in recesses 20 in spacer rings 21 mounted on the shaft 1, thereby firmly mounting the knives. The cutting edges of these knives extend downwardly toward the shaft 1 and forwardly in the direction of the travel of the fruit whereby the knives will slice through and bisect fruit of different sizes advanced at different levels or points in the pathways P and R.

In order that the fruit halves may be more effectively subjected to juice-expressing pressure, that is, may be pressed to extract maximum amounts of juice without expressing objectionable amounts of rind oil and other components of the fruit, the knife means E is provided for slicing across the cut faces and edges of the rind. Cut in this manner, the fruit halves may be subjected to the desired pressure with less force than if the edges of the rind remained intact. Moreover, in more readily responding to pressure in this manner, the rind of the fruit will not be ruptured or subjected to such pressure and abrasion as would release objectionable amounts of rind oil and pulp.

The knife E, as here shown, consists of a plurality of slitting knives 22 arranged in a row along the back edge of each of the bisecting knives 14 and 15. As shown in Fig. 3, the slitting knives 22 are staggered along the curved back edges of the knives 14 and 15, being progressively advanced one beyond the other in the direction of advance of the fruit halves, from the top end to the lower end of the row.

As the fruit halves are advanced past the knives 14 and 15 the cut faces thereof sliding along opposite faces of these knives will encounter the slitting knives 22 so that slicing cuts will be made across the cut faces and the edge of the rind, each knife making cuts or slits at substantially opposite points in the rind. The spacing of the slitting knives 22, as shown, is such that halves of the larger fruit will be slit or cut by two of the knives, although smaller fruit halves may be cut by but one knife. It is obvious that by more closely spacing the knives a greater number of cuts per fruit half will be made. Fig. 9 shows a typical fruit half as cut in accordance with this invention.

Each of the slitting knives 22 comprises, as shown in Fig. 4, a generally flat triangular blade 23 having a central recess 24 extending inwardly from the apical end thereof for reception of a tongue 25 provided along the back edge of the associated bisecting knife. This disposes the cutting edges 26 and 27 formed along the oppositely inclined edges of the blade, in the path of the fruit halves, moving past the bisecting knives.

As the cut faces of the fruit halves slide along opposite faces of the bisecting knives, the cutting edges 26 and 27 will cut along the leading and trailing portions of the edges of the rind as well as across the cut faces. The cutting edges 26 and 27 being extended divergently in the direction of advance of the fruit, as shown in Fig. 4, will slice easily across the cut faces and rind edges, with the depth of the cuts increasing as the fruit advances along these edges.

The halves are advanced from the slicing blades 23 into pressure paths P', P'', R' and R'' defined between partition plates 28 and 29 and the disks 8, 9, 10 and 11. These plates are secured at spaced points along their upper edges as shown in Figs. 3 and 6, by means of bolts 30 and spacer sleeves 31, to arms 32 extending from the wall 18 of the housing C. The forward edges of the partition plates 28 and 29 are formed with grooves 33 as shown in Fig. 5 to receive the tongues 25 on the bisecting knives 14 and 15, thereby joining the back edges of the bisecting knives to the forward edges of the partition plates. The forward edges of these partition plates are also provided with transverse slots 34 which intersect the recesses 33 as shown in Fig. 4, and receive the slitting blades 23. The wider ends of these blades are notched as at 35 to receive the portions 35' of the partition plates, thereby securely mounting the blades.

The bisecting knives 14 and 15 gradually increase in thickness (see Fig. 4) towards their back edges. The partition plates 28 and 29 are also gradually increased in thickness from their leading edges toward their outer and lower edges. Thus the pressure paths P', P'', R', R'', in effect start at the cutting edges of the knives 14 and 15 in that they are defined between surfaces which converge in the general direction of travel of the fruit.

The cut faces of the fruit halves slide along the knives 14 and 15 and then past the slitting blades 23 and along the sides of the partition plates 28 and 29 while the rind sides of the halves are gripped by the rotating disks 8, 9, 10 and 11. While advancing in these pressure paths, the fruit halves are subjected to a gradually increasing pressure due to the progressive restriction of the pressure paths, thereby commencing the juice extracting operation.

The fruit halves advancing past the lower edges of the partition plates 28 and 29, enter arcuate continuations P1, P2, R1 and R2 of pressure paths P', P'', R' and R'' respectively. These continuation paths start at the lower edges of the plates 28 and 29 and end at the discharge zone T for the spent fruit.

The paths P1, P2 are formed between a pair of perforated and opposed pressure plates 36 and 37 and the disks 8 and 9, whereas the paths R1 and R2 are formed between a pair of perforated opposed pressure plates 38 and 39 and the disks 10 and 11. The pressure plates of each pair are formed as segments of an annulus and are joined at corresponding upper edges by means of a web portion 40. These web portions abut the lower edges of the partition plates 28 and 29 and the outer faces of the pressure plates are flush with the outer faces of the partition plates. The inner arcuate edges of the pressure plates of each pair are joined by a segmental hub portion 42 embracing the associated spacer ring 21 on the shaft 1.

Each pair of pressure plates is mounted in place by means of bolts 43 extending through ears 44 and screwed into projections 45 on the wall 18 of the housing C, as shown in Figs. 2 and 3.

The pressure plates 36, 37, 38 and 39 are formed to provide outer surfaces which extend somewhat spirally between the disks 8, 9, 10 and 11 associated therewith, toward the outlet ends of the pressure paths, whereby these surfaces converge with the surfaces of these disks in the direction of advance of the fruit. In other words the pressure plates of each pair diverge radially from the hub portion thereof, with a progressive increase in the extent of divergence in the direction of advance of the fruit halves, whereby the pressure paths are gradually constricted in said direction of advance. This provides for a progressive increase in pressure on the fruit halves to the extent that they become substantially flattened before being discharged from the pressure paths, thereby obtaining a maximum yield of juice.

As a means for washing the apparatus, spray pipes 46 extend beneath the disks 8, 9, 10 and 11 for directing jets of steam, water, or other washing fluid, onto the surfaces defining the pathways P and R as well as on the knives. These pipes are coupled as at 47 to a source of supply of steam, water or other fluid (not shown). Fluid chambers 48 are provided beneath the feed chutes 13 and are supplied through the pipes 46. Passages 49 lead from these chambers to parts around the shaft which are inaccessible to the spray from the pipes 46, whereby such parts may be washed.

In order to provide for a cushioned gripping of the fruit by the rotary disks 8, 9, 10 and 11 and to prevent abrasion of the rind and consequent release of rind oils, the opposed surfaces of these disks may be covered by annular resilient members 50 of rubber or synthetic rubber, vulcanized or otherwise secured thereto. The fruit contacting surfaces of these resilient members may be roughened or formed with protuberances or the like to effect a positive gripping and advance of the fruit.

*Operation*

In the operation of this apparatus whole citrus fruit, for example oranges of different sizes, are fed continuously by the feed means A, through the openings 12 in the housing C into the feed chutes 13, which deposit the fruit into the intake ends S of the pathways P and R respectively provided between the disks 8 and 9, and the disks 10 and 11. The whole pieces of fruit will wedge according to size at different levels between the disks and as the disks are continuously rotated, these whole pieces will be advanced to the bisecting knives 14 and 15 where they will be halved as they move past the knives.

The fruit halves in being advanced past the knives 14 and 15, encounter the slicing blades 23 so that cuts are made across the cut faces of the fruit halves and at opposite points in the edge of the rind. As the fruit halves continue to advance and pass the blades 23 they enter the pressure paths P', P", R' and R" and slide over the partition plates in the pressure paths P1, P2, R1 and R2 where the halves are subjected to a progressively increasing pressure until the halves become substantially flattened.

It should be noted that the cuts made at opposite points in the edge of the rind of each piece of fruit by the blades 23, make it possible to exert the desired fruit-expressing pressure without abrading the rind or subjecting it to the treatment that would take place if the rind edge remained intact or uncut. Thus, the expression of an objectionable amount of rind oil and pulp is prevented, stresses on the pressure elements are lessened and in all a more efficient operation of the apparatus is brought about.

I claim:

1. In a fruit juice extractor, a housing, means within the housing for moving halved citrus fruit in a given direction, a plurality of cutting blades in the path of movement of the fruit halves, said blades being spaced from one another laterally as well as longitudinally of the path of movement to make a plurality of cuts through the edges of the rind from the cut surfaces of the halves toward the peaks of the halves and terminating short of said peaks, and means in the path of said advance for expressing the juice from said halved fruit.

2. In a fruit juice extractor, a pair of opposed members mounted for rotation about a common axis and having opposed convex surfaces between which citrus fruit halves are gripped and advanced in a plurality of paths about said axis, defined according to the sizes of the fruit halves, cutting blades arranged in spaced relation to one another in a row extending across said paths for making cuts across the edges of the rind of the fruit halves from the cut surfaces of the halves partially through the halves as the latter are advanced, and means for compressing said cut halves to express the juice therefrom.

3. In a fruit juice extractor, a pair of opposed members mounted for rotation about a common axis and having opposed convex surfaces between which citrus fruit halves are gripped and advanced in a plurality of paths about said axis, defined according to the sizes of the fruit halves, cutting blades arranged in spaced relation to one another in a row extending across said paths for making cuts across the cut faces and at opposite points in the edges of the rind of the fruit halves as the latter are advanced, and means for compressing said cut halves to express the juice therefrom, said blades being staggered in the direction of advance of the fruit halves.

4. In a fruit juice extractor, a housing, means forming opposed surfaces for moving halved citrus fruit in a path within said housing, means cooperable with said surfaces for exerting flattening pressures on the halved fruit as it is moved in said path, and cutting blades in the path of movement of said halves for making a plurality of cuts across the cut faces of each of the fruit halves so as to slit the edge of the rind from the cut surfaces of the halves partially through the halves.

5. In a fruit juice extractor, a pair of opposed circular disks mounted for rotation about an axis and having opposed coniform surfaces forming an annular passage therebetween about said axis and which is gradually constricted radially of said disks to provide a wedging grip of whole fruit of different sizes deposited between said surfaces, a stationary member having perforate walls disposed between said surfaces and defining therewith a pair of pressure paths occupying a segment of said annular passage, said walls being angularly disposed to constrict said paths in the direction of movement of the fruit, cutting means between said disks having a curved cutting edge ranging toward said axis in the general direction of advance of the fruit for bisecting whole fruit advanced thereagainst and guiding the fruit halves toward said paths responsive to rotation of said disks, means for rotating said disks, and means for cutting across the cut faces of the fruit halves as the latter are being advanced into said pressure paths.

6. In a fruit juice extractor, a pair of opposed circular disks mounted for rotation about an axis and having opposed coniform surfaces forming an annular passage therebetween about said axis and which is gradually constricted radially of said axis to provide for a wedging grip of whole fruit of different sizes fed between said surfaces, a stationary member having perforate walls disposed between said surfaces and defining therewith a pair of pressure paths occupying a segment of said annular passage, said walls being angularly disposed to constrict said paths in the direction of movement of the fruit, and cutting means between said disks operating first to bisect the fruit, then to cut across the cut faces and the edge of the rind of the fruit halves as the fruit is being advanced to said pressure paths responsive to rotation of said disks.

7. In a fruit juice extractor: a pair of opposed members, means mounting said members for rotation about a common horizontal axis; said members having opposed convex surfaces forming therebetween an annular fruit-receiving space which progressively decreases in width toward said axis, an arcuate member of lesser arcuate extent than said space mounted between said members and defining therewith a pair of pressure paths, said arcuate member having surfaces which converge with surfaces of said rotary members opposite thereto in the direction of advance of said fruit, providing wide inlet ends for said paths and narrow outlet ends for said paths, means for rotating said rotary members to advance the fruit through said paths, cutting means in said annular space for cutting whole fruit advanced by and between said rotary members and guiding the cut sections of fruit into said paths during rotation of said rotary members, and other cutting means in said annular space for slitting the edges of the rind as the fruit sections are advanced to said pressure paths.

8. In apparatus for treating cut sections of citrus fruit having the rind thereon preparatory to expressing juice therefrom, means for advancing said sections in a given direction in a pair of side-by-side paths, and a slicing blade having a pair of cutting edges each positioned in one of said paths for slicing across the cut faces and rind of said sections, said cutting edges diverging in the direction of advance of the fruit sections.

9. In apparatus for cutting citrus fruit preparatory to expressing juice therefrom, means for advancing whole citrus fruit in a given path, a knife in said path for bisecting the fruit, a plate in said path cooperable with said knife and said advancing means to define two paths in which the fruit halves are advanced, a cutting blade having two cutting edges, and cooperable means on said knife, plate and blade respectively for mounting said blade with the cutting edges positioned in said two paths for slicing across the cut faces and the rind of the fruit halves.

10. In apparatus for cutting citrus fruit preparatory to expressing juice therefrom, means for advancing whole citrus fruit in a given path, a knife in said path for bisecting the fruit, a plate in said path cooperable with said knife and said advancing means to define two paths in which the fruit halves are advanced, a cutting blade having two cutting edges, and cooperable means on said knife, plate and blade respectively for mounting said blade with the cutting edges positioned in said two paths for slicing across the cut faces and the rind of the fruit halves, said cutting edges diverging in the direction of advance of the halves.

11. In apparatus for treating cut sections of citrus fruit preparatory to expressing juice therefrom; a member having surfaces on opposite sides thereof for contacting the cut faces of said sections; means for advancing said sections on said surfaces; a blade having cutting edges; and means mounting said blade with its cutting edges extending from said surfaces into the paths of advance of said sections a distance less than the maximum thickness of said sections between the cut faces and the rind thereof.

12. In apparatus for cutting citrus fruit preparatory to expressing juice therefrom; means for advancing whole citrus fruit in a given path; a knife in said path for bisecting the fruit; said knife cooperating with said advancing means for guiding each fruit half in a separate path; a blade having cutting edges; and means mounting the blade on said knife with the cutting edges thereof disposed to cut the rind edge of the sections advanced in said separate paths.

13. In a fruit juice extractor: an axle, a pair of opposed members; means mounting said members for rotation about said axle; said members having opposed surfaces converging in a direction toward said axle for gripping and advancing fruit therebetween in different arcuate paths radially spaced from said axle according to the size of the fruit; knife means between said surfaces for bisecting fruit during said advance; a stationary member between said surfaces rearwardly of said knife means and diverging in the direction of said advance to cooperate with said surfaces to express juice from the cut fruit during said advance; and cutting blades projecting into said arcuate paths rearwardly of said knife means and positioned for making cuts across the edges of the rind of the fruit halves from the cut faces toward the peaks thereof.

14. Apparatus as defined in claim 12 in which said cutting blades are spaced both radially and circumferentially in said arcuate paths.

15. A method of extracting juice from citrus fruit comprising gripping a whole fruit at generally diametrically opposite areas of the fruit, moving the fruit while thus gripped through a path, bisecting the fruit between the gripped areas thereof, continuing the movement of the fruit halves along said path while gripping the cut face and the peak of each fruit half, making a first partial cut through each fruit half from the cut face toward the peak thereof and, while continuing the movement of the fruit halves through said path, making a second partial cut through each fruit half from the cut face toward the peak thereof, said second partial cut being made after said first cut has been started and in a position spaced transversely of said path of travel from said first cut, and progressively increasing said gripping pressure on said fruit halves to at least partially flatten said fruit halves to extract juice therefrom.

References Cited in the file of this patent
UNITED STATES PATENTS

| | | |
|---|---|---|
| 1,366,291 | Smith | Jan. 18, 1921 |
| 1,531,367 | Ahrens | Mar. 31, 1925 |
| 2,205,059 | Clark | Jan. 18, 1940 |
| 2,261,095 | Mesterton | Oct. 28, 1941 |
| 2,318,904 | Thomson | May 11, 1943 |
| 2,373,973 | Paradis | Apr. 17, 1945 |
| 2,479,194 | Eastman | Aug. 16, 1949 |
| 2,508,868 | Ross | May 23, 1950 |
| 2,515,749 | Wallace et al. | July 18, 1950 |
| 2,515,772 | Hewlett | July 18, 1950 |
| 2,538,590 | Polk | Jan. 16, 1951 |
| 2,608,486 | Arndt | Aug. 26, 1952 |